(12) United States Patent
Blalock et al.

(10) Patent No.: US 9,010,192 B2
(45) Date of Patent: Apr. 21, 2015

(54) MANOMETER QUICK CONNECT DEVICE FOR TESTING GAS PRESSURE OF A HOUSEHOLD COOKING APPLIANCE

(71) Applicant: BSH Home Appliances Corporation, Irvine, CA (US)

(72) Inventors: Edward Blalock, Jacksboro, TN (US); Donnie Smith, Andersonville, TN (US); Claude Wilson, Jacksboro, TN (US)

(73) Assignee: BSH Home Appliances Corporation, Irvine, CA (US)

( * ) Notice: Subject to any disclaimer, the term of this patent is extended or adjusted under 35 U.S.C. 154(b) by 164 days.

(21) Appl. No.: 13/921,306

(22) Filed: Jun. 19, 2013

(65) Prior Publication Data

US 2014/0373634 A1    Dec. 25, 2014

(51) Int. Cl.
*G01L 19/00* (2006.01)

(52) U.S. Cl.
CPC ........... *G01L 19/003* (2013.01); *G01L 19/0007* (2013.01)

(58) Field of Classification Search
None
See application file for complete search history.

(56) References Cited

U.S. PATENT DOCUMENTS

| | | | |
|---|---|---|---|
| 4,157,043 A | | 6/1979 | Peterson et al. |
| 4,223,969 A | * | 9/1980 | Gatturna ........................ 439/194 |
| 5,187,974 A | | 2/1993 | Mellits et al. |
| 5,875,413 A | | 2/1999 | Vinci |
| 6,209,562 B1 | | 4/2001 | Shaw |
| 6,675,829 B2 | | 1/2004 | Moore et al. |
| 7,216,531 B2 | | 5/2007 | Young et al. |
| 2006/0147861 A1 | * | 7/2006 | Czajka et al. ................. 431/278 |
| 2007/0051167 A1 | | 3/2007 | Finley |

FOREIGN PATENT DOCUMENTS

EP      0363229 A1 *  4/1990

OTHER PUBLICATIONS

Apex Instruments, Isokinetic Source Sampling Equipment, Online: Apexinst.com, publication date: unknown accessed Dec. 14, 2012.
Meriam Instrument, Meriam 35EE portable Digital Manometer/Calibrator, Online: TEquipment.net, publication date: Mar. 1997.
Omega Engineering, Inc., Economical Monometer Single or Differential Inputs, Online: Omega.com, publication date unknown: accessed Dec. 13, 2012.
Fieldpiece, Dua Port Differential Manometer, Model SDMN5, Online: Fieldpiece.com, publication date unknown.

* cited by examiner

*Primary Examiner* — Andre Allen
(74) *Attorney, Agent, or Firm* — James E. Howard; Andre Pallapies

(57) ABSTRACT

A manometer quick connect device is provided for pressure testing a gas outlet of a household cooking appliance. The manometer quick connect device include a body having a first end and a second end opposite the first end, the body having a hollow cavity extending from the first end to the second end, wherein the first end of the body includes a feature for coupling the manometer quick connect device to a manometer, and a seal at the second end of the body, wherein the seal includes a sealing surface for sealing the hollow cavity of the body to a surface of the gas outlet, the seal including an opening for providing fluid communication between the hollow cavity and an orifice of the gas outlet.

19 Claims, 12 Drawing Sheets

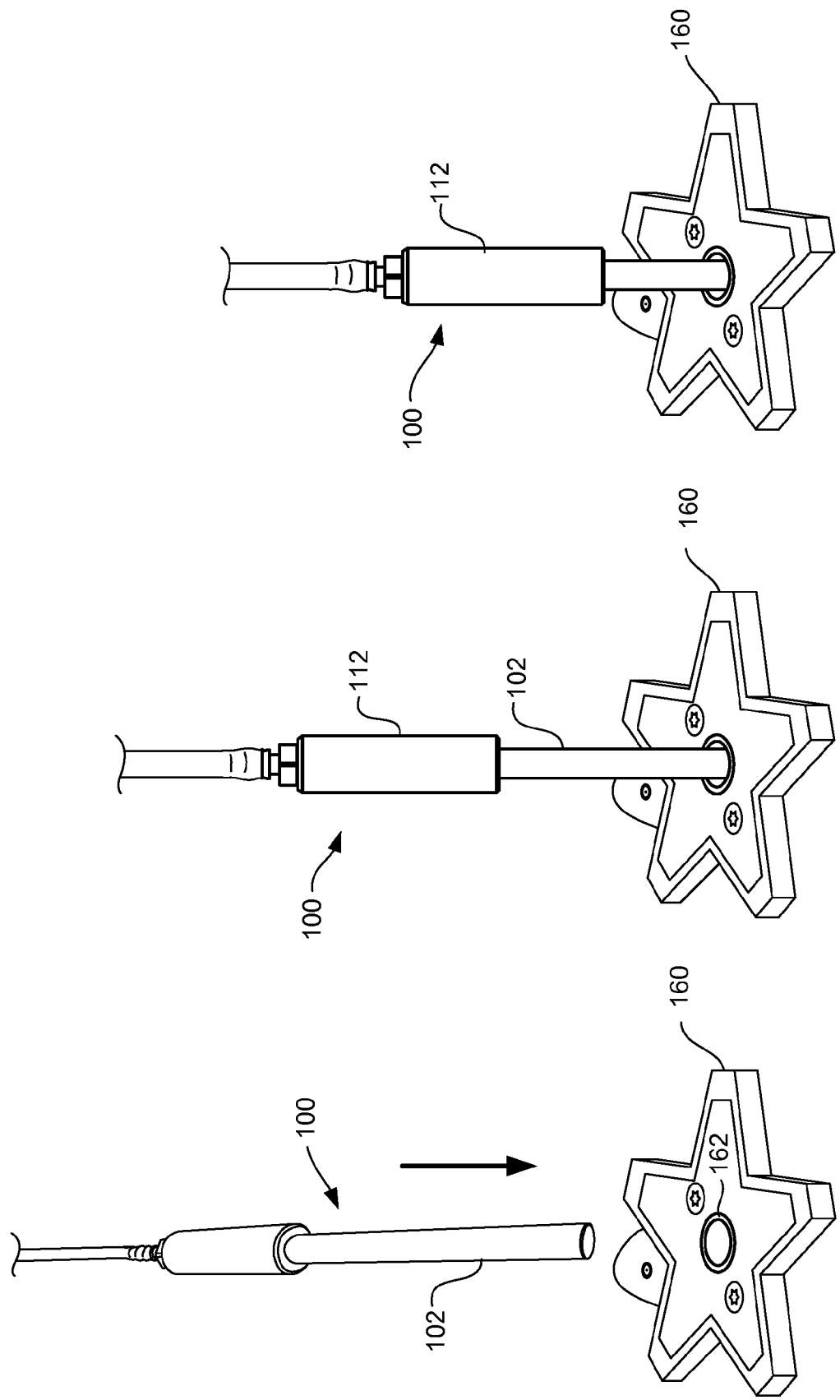

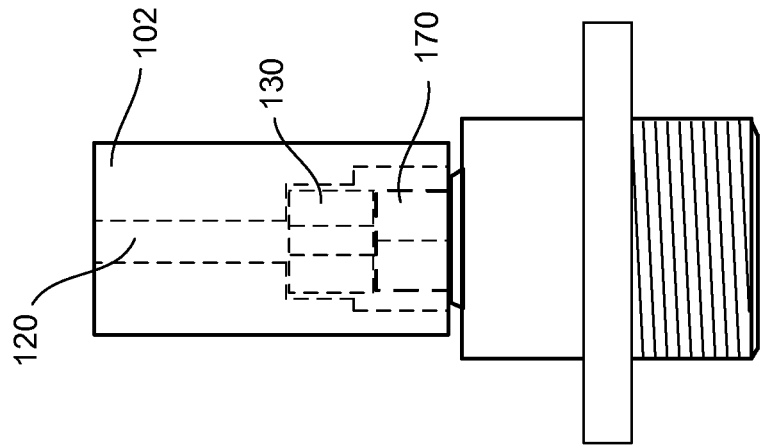
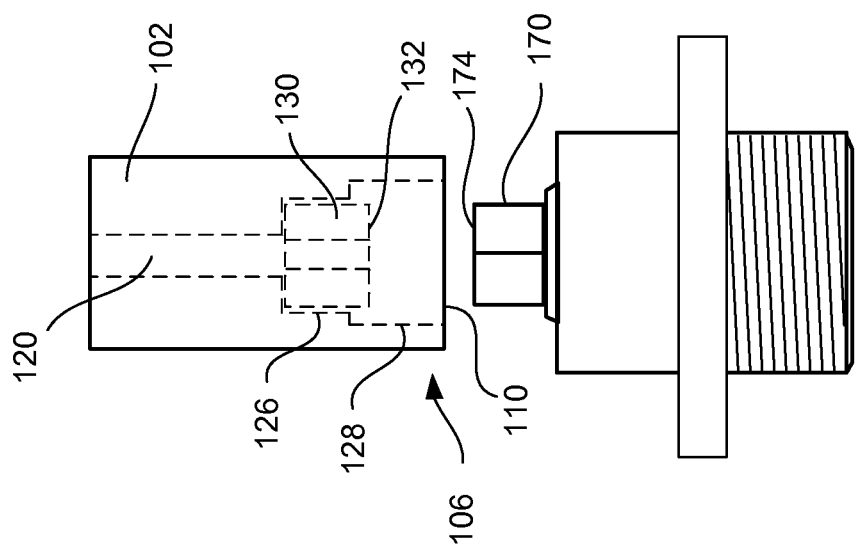

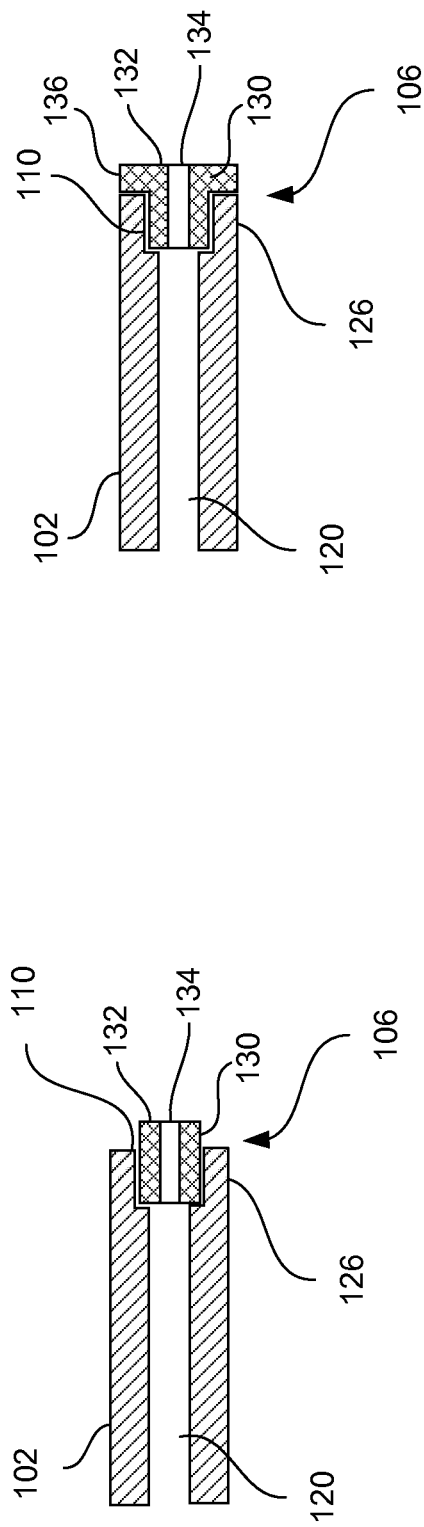
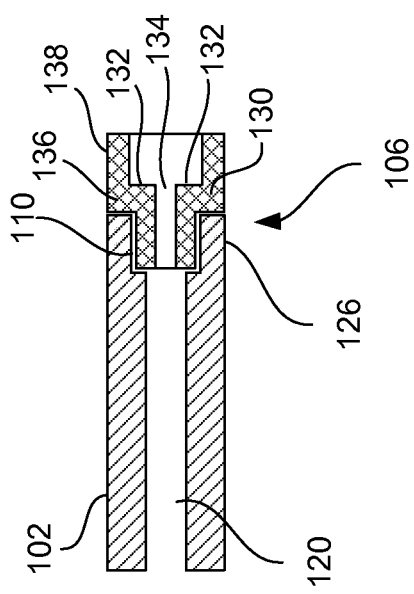
FIG. 14
FIG. 15
FIG. 16

MANOMETER QUICK CONNECT DEVICE FOR TESTING GAS PRESSURE OF A HOUSEHOLD COOKING APPLIANCE

FIELD OF THE INVENTION

The present invention is directed to a manometer quick connect device for pressure testing a gas outlet of a household cooking appliance, and more particularly, to a manometer quick connect device for simply and easily testing the gas pressure of a gas outlet of a household cooking appliance without requiring disassembly of the appliance.

BACKGROUND OF THE INVENTION

A household cooking appliance may require a certain amount of gas inlet pressure to operate normally. Therefore, when diagnosing problems or trouble shooting operation or performance issues associated with a household cooking appliance, a first step performed by a technician ordinarily is to check the incoming pressure at a gas outlet using a pressure measuring device, such as a manometer, to diagnose any problems that could be associated with the gas inlet pressure. If the measured gas pressure at the gas outlet is acceptable or within predetermined requirements, then a technician can eliminate the gas pressure as the source of the problem and take additional steps to identify and diagnose other possible sources of the problem. However, in order to check the pressure at the gas outlet, the technician first must disassemble at least a part of the appliance to gain access to an orifice of the gas outlet with the pressure measuring device. For a gas burner of a cook top of a household appliance, the technician must remove most or all of the parts of the gas burner that are located above the orifice of the gas outlet. For example, the technician ordinarily first must remove the burner head, which typically rests on top of the burner under its own weight and protects the burner underneath from spills, etc. Next, the technician must then remove several screws to disassemble the parts of the burner so that the orifice of the gas outlet is exposed and accessible for testing the gas outlet pressure using the pressure measuring device. This process typically requires the technician to remove one or more of the burner body, the igniter, the burner pedestal (if so equipped), and the venturi tube extending through the burner to the orifice of the gas outlet. Once the orifice of the gas outlet is exposed and accessible, the technician can perform the step of measuring the gas outlet pressure with the pressure measuring device. Afterwards, the technician then must perform the steps in reverse order to reassemble the venturi tube, pedestal, igniter, and burner body, and then secure the parts in place by reinserting the plurality of screws. The burner head of the burner can then be placed back over the burner body. As a result, this first step in diagnosing problems with the household cooking appliance requires the technician to invest a considerable amount of time and effort both prior to performing the pressure test and after completion of the pressure test, which increases the complexity of the diagnosis process and reduces the efficiency of the diagnosis process.

SUMMARY OF THE INVENTION

The present invention, as illustrated for example in the exemplary embodiments, provides a manometer quick connect device for pressure testing a gas outlet of a household cooking appliance. The manometer quick connect device comprises a body having a first end and a second end opposite the first end, the body having a hollow cavity extending in a longitudinal direction from a first opening in the first end to a second opening in the second end, the first end of the body including a feature for coupling the manometer quick connect device to a manometer, and a seal at the second end of the body, wherein the seal includes a sealing surface for sealing the hollow cavity of the body to a surface of the gas outlet, the seal including an opening for providing fluid communication between the hollow cavity and an orifice of the gas outlet.

The present invention, as illustrated for example in the exemplary embodiments, also provides a manometer quick connect device for pressure testing a gas outlet of a household cooking appliance, in which the manometer quick connect device comprises a body having a first end and a second end opposite the first end, the body having a hollow cavity extending in a longitudinal direction from a first opening in the first end to a second opening in the second end, the first end of the body including means for coupling the manometer quick connect device to a manometer; and sealing means at the second end of the body, the sealing means for sealing the hollow cavity of the body to a surface of the gas outlet and providing fluid communication between the hollow cavity and an orifice of the gas outlet.

In this way, the present invention enables a technician to simply and easily test the incoming pressure at the gas outlet of a gas burner of a household cooking appliance using a pressure measuring device without requiring the time-consuming and labor intensive process of disassembling and reassembling the gas burner. Particularly, the present invention enables the technician to simply and easily access the orifice of the gas outlet of a household cooking appliance by simply removing the burner head (which typically only rests on top of the burner under its own weight to protect the burner underneath from spills) and inserting the manometer quick connect device into the burner (e.g., into the venturi tube of the burner) in order to test the incoming pressure at the gas outlet using a pressure measuring device, such as a manometer, to diagnose any problems that could be associated with the gas inlet pressure. Once the manometer quick connect device is inserted into the burner (e.g., into the venturi tube of the burner), the seal of the manometer quick connect device engages and seals the manometer quick connect device over the orifice of the gas outlet, thereby enabling the incoming pressure at the gas outlet to be measured using the pressure measuring device without requiring disassembly and reassembly of the burner. As a result, the present invention enables the first step in diagnosing problems with the household cooking appliance to be performed with very little time and effort, thereby reducing the complexity of the diagnosis process and increasing the efficiency of the diagnosis process.

Unlike the conventional methods that require disassembling the burner to access the gas outlet, the present invention requires little or no disassembly of the burner of the household appliance, is simple and easy to use, and requires minimal time to perform the gas outlet pressure test, thereby providing an efficient and quick reference to eliminate gas pressure issues when diagnosing problems with a burner of a household appliance such that the technician can focus on and devote more available time to evaluating and diagnosing other potential problems with the burner. The present invention can provide important advantages during testing and/or diagnosis of a household appliance at the factory, as well as diagnosis of a household appliance by a service technician in the field during use by the consumer.

The exemplary embodiments can be configured to be coupled to a pressure measuring device, such as a manometer, digital manometer, etc., by a hose, such as a rubber hose or a rigid hose or conduit. For example, an end of the manometer quick connect device can be configured to receive a hose connector for receiving a hose. Alternatively, an exemplary embodiment can be configured to be directly coupled to the pressure measuring device by directly connecting the pressure measuring device to an end of the manometer quick connect device. For example, an end of the manometer quick connect device can be configured to directly receive or engage a part of the pressure measuring device, such as a fitting formed directly on the pressure measuring device.

The exemplary embodiments can be configured to be sealed to the orifice of the gas outlet using a seal. The seal can be configured to be internally mounted within the body of the manometer quick connect device such that a part of the body of the manometer quick connect device engages or surrounds at least a part of the gas outlet when the seal is sealed to the gas outlet. In this way, the opening in the end of the body of the manometer quick connect device also can function to guide the device onto the gas outlet to easily and properly align the seal around the orifice of the gas outlet. In an exemplary embodiment, the body of the manometer quick connect device can include a seat for securing the seal entirely within the body. The seat can have a size and shape corresponding to the size and shape of the seal to securely hold the seal therein. The seal can be secured to the seat, for example, with an adhesive or the like, or press-fit into the seat.

In another exemplary embodiment, the body of the manometer quick connect device optionally can include a second seat or guide located for example between the seal and the opening of the body of the manometer quick connect device. The guide can be configured to permit the end of the body to extend over at least a part of the gas outlet such that at least a portion of the gas outlet is received within the opening of the body when a sealing surface of the seal is sealed against the surface of the gas outlet.

More particularly, in an exemplary embodiment, the second seat or guide can have a larger inside diameter or dimension than the outside diameter or dimension of a part of the gas outlet to function as a guide and/or to provide clearance for receiving the part of the gas outlet within the opening of the body, thereby accounting for varying degrees of misalignment of the second opening of the body with the gas outlet during insertion of the body into the burner (e.g., into the venturi tube of the burner). In other embodiments, the second seat or guide can be tapered to aid in guiding or redirecting the gas outlet into the opening of the body during the process of inserting the body into the burner. In this way, the second seat or guide can simply and easily align the seal with the orifice and the surface of the gas outlet even though the orifice and the surface of the gas outlet are hidden from view by the assembled parts of the gas burner and particularly when the body of the exemplary manometer quick connect device is inserted into the burner (e.g., into a venturi tube of the burner) during the testing process.

In another exemplary embodiment, the second seat or guide can have an inside diameter or dimension that is the same as, or approximately or substantially the same as, the outside diameter or dimension of a part of the gas outlet such that a part of the gas outlet fits tightly or snuggly into the second seat portion, thereby providing a more accurate alignment of the seal around the orifice. The second seat or guide optionally can be configured to provide a tactile engagement with the gas outlet such that the technician can perceive the proper alignment and engagement of the second seat portion with the gas outlet without visibly inspecting the connection, since these components are not visible to the technician during the testing process. As explained above, these features are important for aligning the seal with the orifice and the surface of the gas outlet even though the orifice and the surface of the gas outlet are hidden from view by the assembled parts of the gas burner and particularly when the body of the exemplary manometer quick connect device is inserted into the burner (e.g., into a venturi tube of the burner) during the testing process.

In other embodiments, at least a part of the seal can be flush with, or extend from, an opening of the body of the manometer quick connect device when the seal is sealed to the gas outlet. The seal can be configured to abut and seal against a surface of the gas outlet having the orifice or surrounding the orifice. In other exemplary embodiments, the seal can be configured to seal against other surfaces of the gas outlet, such as the sides of the gas outlet, as long as a seal is formed between the manometer quick connect device and the orifice of the gas outlet.

In another exemplary embodiment, at least a part of the seal can be configured to extend longitudinally away from the end of the manometer quick connect device to guide the device onto the gas outlet to easily and properly align the seal around the orifice of the gas outlet. For example, the seal can include one or more vertical walls, such as a cylindrical vertical wall, that extends longitudinally away from the sealing surface of the seal. The vertical wall or walls can engage the gas outlet to guide the device onto the gas outlet for easily and properly aligning the seal around the orifice of the gas outlet.

The body can be selected to have a size and shape that is capable of being inserted into a respective burner body, for example through a venturi tube, to reach the orifice of the gas outlet of the burner. More particularly, the size and shape can be selected such that the width or diameter, the cross-sectional shape, and/or the longitudinal shape of the body is capable of being inserted into a respective burner body, for example through a venturi tube, to reach the orifice of the gas outlet of the burner. In this way, the orifice of the gas outlet of a household cooking appliance, which otherwise would be inaccessible using conventional means, can be simply and easily accessed by the technician without requiring the expenditure of considerable time and effort to disassemble and reassemble part or all of the gas burner. As a result, the present invention enables the first step in diagnosing problems with the household cooking appliance to be performed with very little time and effort, thereby reducing the complexity of the diagnosis process and increasing the efficiency of the diagnosis process.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 7A is a side, cross-sectional view, and FIG. 7B is a plan view, of a seal of the manometer quick connect device according to an exemplary embodiment;

FIGS. 10A-10C are perspective views showing an exemplary method of inserting a manometer quick connect device, according to an exemplary embodiment of the invention, into the conventional gas burner illustrated in FIG. 9;

FIGS. 11A and 11B are partial side views of an example of inserting a manometer quick connect device, according to an exemplary embodiment of the invention, over an orifice of a gas outlet of a household appliance;

FIG. 14 is a partial side, cross-sectional view of a second end of a manometer quick connect device according to another exemplary embodiment of the invention;

FIG. 15 is a partial side, cross-sectional view of a second end of a manometer quick connect device according to yet another exemplary embodiment of the invention; and FIG. 16 is a partial side, cross-sectional view of a second end of a manometer quick connect device according to yet another exemplary embodiment of the invention.

DETAILED DESCRIPTION OF THE EXEMPLARY EMBODIMENTS OF THE INVENTION

Figure 1:
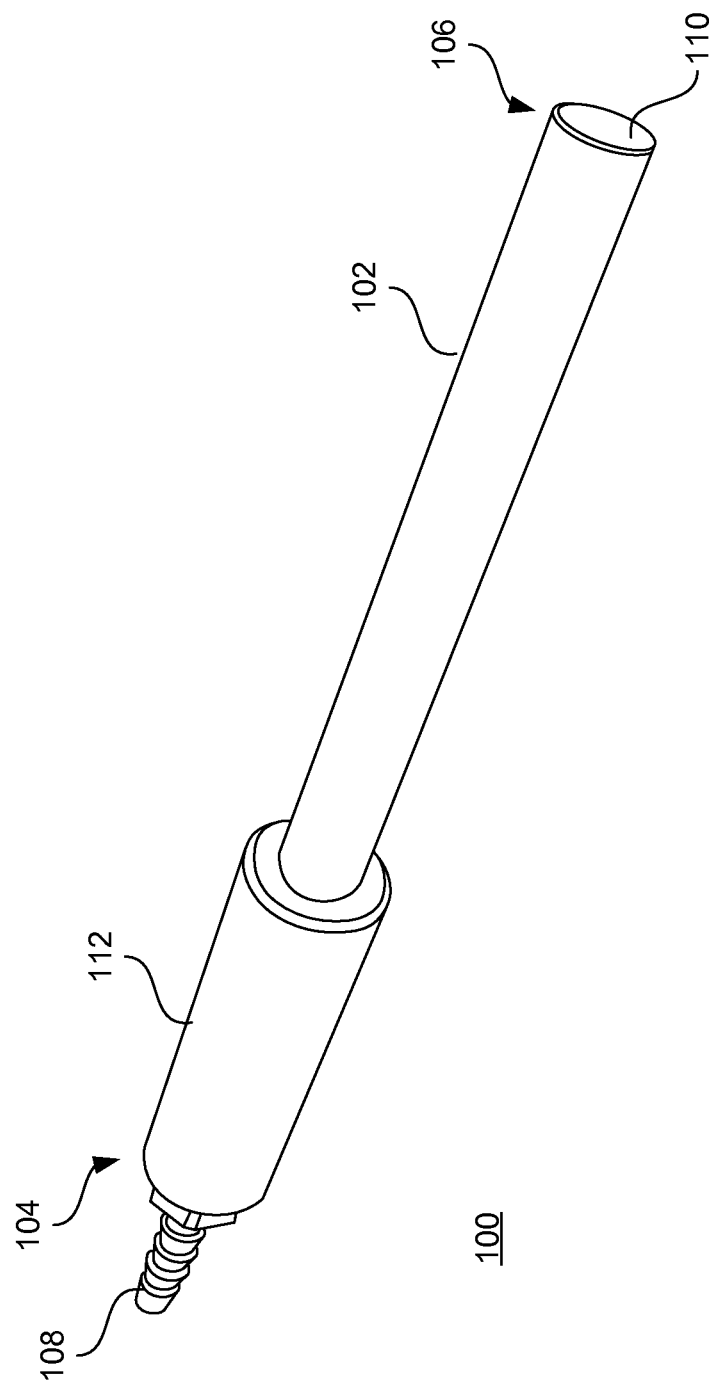
FIG. 1 is a perspective view of a manometer quick connect device according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1-16 illustrate exemplary embodiments of a manometer quick connect device 100 for pressure testing a gas outlet of a household cooking appliance.

Figure 2:
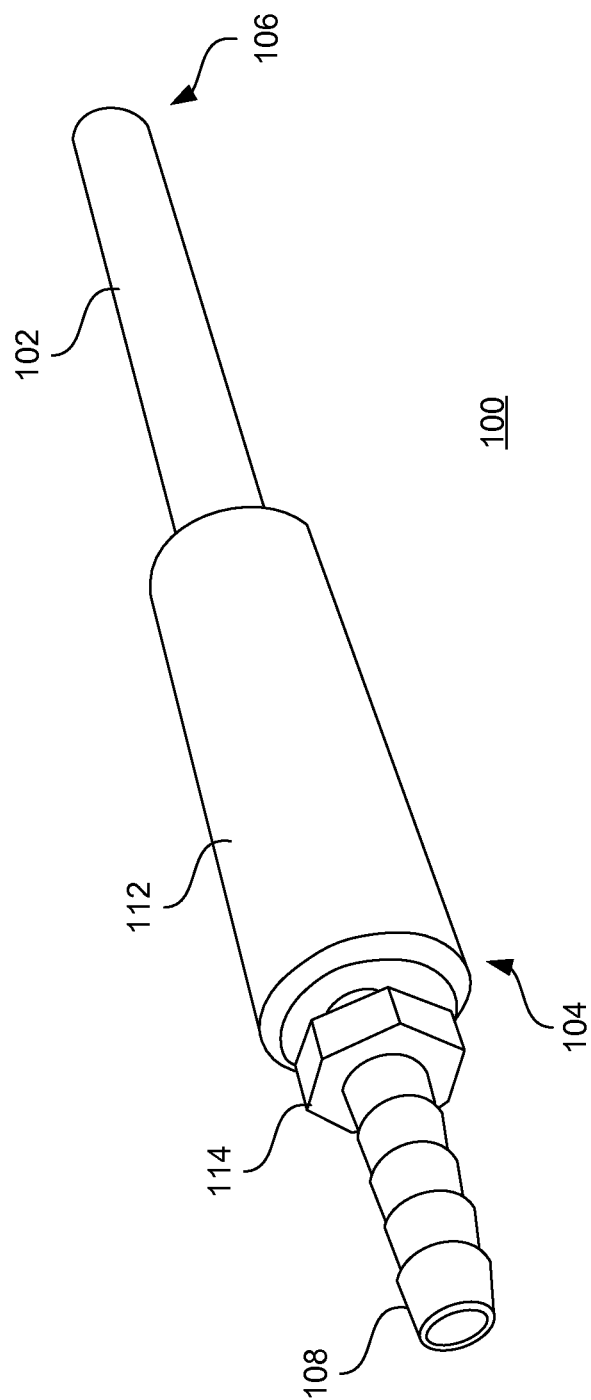
FIG. 2 is another perspective view of the manometer quick connect device according to the exemplary embodiment of FIG. 1.
Figure 3:
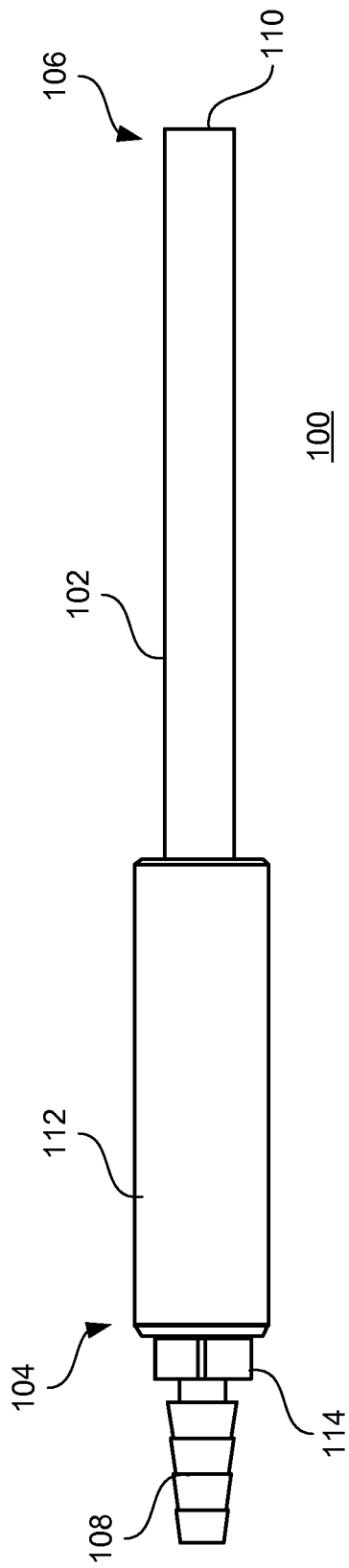
FIG. 3 is a side view of the manometer quick connect device according to the exemplary embodiment of FIG. 1.

As shown in FIGS. 1-3, an exemplary embodiment of a manometer quick connect device 100 can include a body 102, such as a tubular body, with a first end 104 and a second end 106, which is opposite the first end. The body 102 is not limited to the cylindrical shaped body illustrated in the exemplary embodiment of FIGS. 1-3, and can include any suitable shape. The body 102 can be selected to have a size and shape that is capable of being inserted into a respective burner body, for example through a venturi tube, to reach the orifice of the gas outlet of the burner (which will be described in greater detail with reference to FIGS. 9-11B) without disassembling the gas burner. More particularly, the size and shape can be selected such that the width or diameter, the cross-sectional shape, and/or the longitudinal shape of the body is capable of being inserted into a respective burner body, for example through a venturi tube, to reach the orifice of the gas outlet of the burner without disassembling the gas burner. For example, the body 102 can have a cylindrical or tubular cross-sectional shape with a diameter that is less than a diameter of a venturi tube of a respective burner body and with a length that is greater than a depth from an upper end of the venturi tube to the orifice of the gas outlet at or below the lower end of the venturi tube.

The body 102 can be configured to receive a hose connector 108 at the first end for coupling the device 100 to a hose of a monometer (which will be described in greater detail with reference to FIG. 8). The hose connector 108 can be coupled to the body 102 by a coupling 114, which can be integrally formed with the hose connector 108 or formed as a separate component from the hose connector 108. The body 102 optionally can include a handle or gripping portion 112 integrally formed with the body 102 or formed as a separate component on the body 102. The body 102 can include an opening (e.g., second opening 110, described below) at the second end 106 for securing a seal (which will be described in greater detail with reference to FIGS. 4 and 6-7B).

Figure 4:
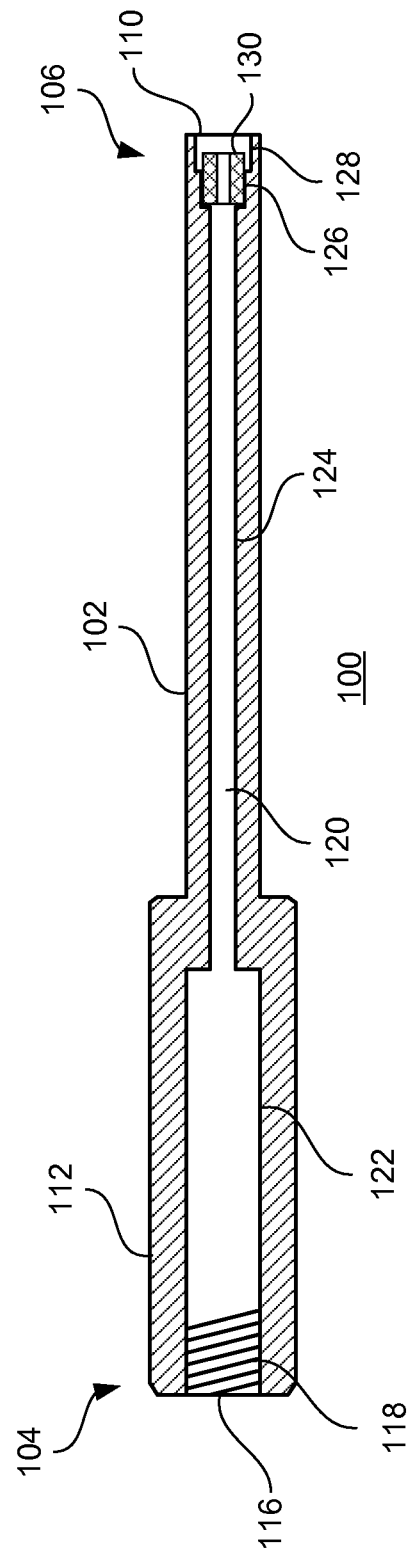
FIG. 4 is a side, cross-sectional view of the manometer quick connect device according to the exemplary embodiment of FIGS. 1-3.
Figure 6:
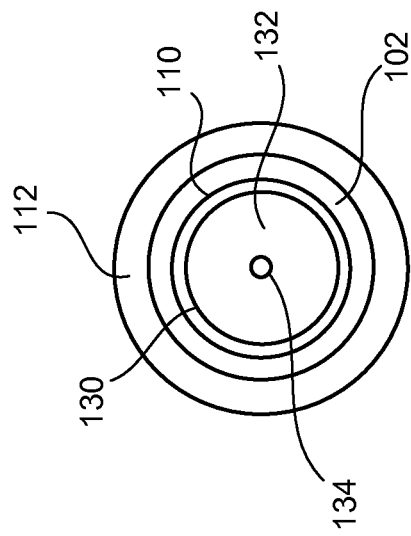
FIG. 6 is an end view of a second end of the manometer quick connect device according to the exemplary embodiment of FIG. 1.

With reference to FIG. 4, the body 102 can include a first opening 116 at the first end 104, a second opening 110 at the second end 106, and a hollow cavity 120, such as a hollow cylindrical cavity, extending in a longitudinal direction from the first opening 116 in the first end 104 to the second opening 110 in the second end 106 for permitting gas from the gas outlet of a household cooking appliance to flow through the device 100 from the first end 104 to the second end 106. The hollow cavity 120 is not limited to the cylindrical shaped hollow cavity illustrated in the exemplary embodiment of FIG. 4, and can include any suitable shape cavity for providing fluid communication between the first opening 116 and the second opening 110.

Figure 5:
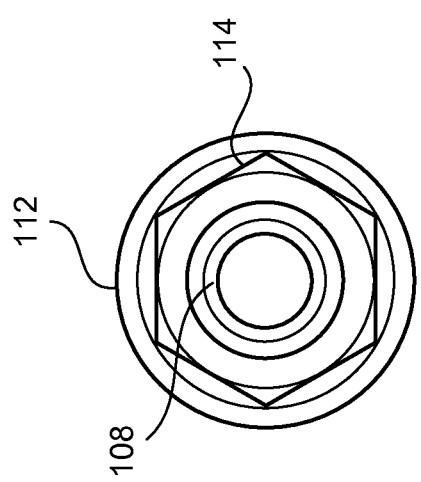
FIG. 5 is an end view of a first end of the manometer quick connect device according to the exemplary embodiment of FIG. 1.

With reference to FIGS. 4 and 5, the body 102 can include means (e.g., features 108, 114, and/or 118) for coupling the manometer quick connect device to a pressure measuring instrument, such as a manometer (described in greater detail with reference to FIG. 8). For example, the body 102 can be configured to receive a hose connector 108 at the first end 104 for coupling the device 100 to a hose of a manometer. The hose connector 108 can be coupled to the body 102 by a coupling 114, which can be integrally formed with the hose connector 108 or formed as a separate component from the hose connector 108. The body 102 can include a threaded portion 118 at the first end 106 for engaging a part of the coupling 114. For example, the hollow cavity 120 at the first end 104 of the body 102 can be tapped such that a corresponding threaded portion of the coupling 114 can be mated with the threaded portion 118 for connecting the hose connector 108 to the body 102.

In an alternative embodiment, the threaded portion 118 of the body 102 alternatively can be formed on the outer surface of the body 102 such that a corresponding threaded portion of the coupling 114 can be secured over the outer threaded portion. In another alternative embodiment, the hose connector 108 can be integrally formed at the first end 104 of the body 102. One of ordinary skill in the art will recognize that other arrangements can be provided for coupling the body 102 to a hose of a manometer within the spirit and scope of the invention. For example, in yet another alternative exemplary embodiment, the device 100 can be configured to be coupled directly to the pressure measuring device. For example, the first end 104 of the manometer quick connect device 100 can be configured to be coupled directly to a fitting of the pressure measuring device without a hose.

With reference again to FIG. 4, the second end 106 of the body 102 can include a seal 130 for sealing the hollow cavity 120 of the body 102 to a gas outlet of a household cooking appliance (described in greater detail with reference to FIGS. 9-11B). The seal can be, for example, a rubber seal or the like. As shown in FIGS. 4, 6, 7A, and 7B, the seal 130 can include, for example, a cylindrical rubber seal 130 having a sealing surface 132 and an opening 134 in the sealing surface 132. The opening can be, for example, centrally located in the sealing surface 132. As described in greater detail below with reference to FIGS. 11A-11B, the sealing surface 132 can be configured to engage or abut a surface of the gas inlet around an orifice of the gas inlet to provide a seal between the cavity and the gas inlet, while the opening 134 can be configured to permit the gas to flow through the seal 130, thereby providing fluid communication between the cavity 120 of the body 102 and the orifice of the gas inlet. The seal 130 is not limited to the cylindrical shape illustrated in the exemplary embodiment of FIGS. 4, 6, 7A, and 7B, and can include any suitable shape for providing a seal between the cavity and the gas inlet, while providing fluid communication between the cavity 120 of the body 102 and the orifice of the gas inlet. For example, the seal 130 can include a cylindrical or tubular shape, as shown in the illustrated exemplary embodiment, or alternatively, a square shape, a rectangular shape, triangular shape, diamond shape, hexagonal shape, or another shape.

With reference again to FIGS. 4 and 6, the second end 106 of the body 102 can be configured to receive and secure the seal 130 within the opening 110, and more particularly, entirely within the hollow cavity 120 adjacent to the opening 110. For example, a first seat portion 126 can be formed with a larger diameter than the hollow cavity 120 to form a seat for securing the seal 130 entirely within the hollow cavity 120 adjacent to the opening 110 and at a predetermined distance in a longitudinal direction away from the opening 110. In this way, a part of the body 102 between the seal 130 and the opening 110 can form a guide for guiding the gas outlet at least partially into the opening 110 such that the internally mounted seal 130 can be easily and quickly engaged and sealed against a surface of the gas outlet. More particularly, a second seat portion 128 optionally can be formed with a larger diameter than the first seat portion 126 to permit the opening 110 of the body 102 to engage and/or extend over a part of the gas outlet such that the internally mounted seal 130 can abut and seal against a surface of the gas outlet, as described in greater detail with reference to FIGS. 11A-11B. In this way, the second seat portion 128 of the body 102 between the seal 130 and the opening 110 can form a guide for guiding the gas outlet at least partially into the opening 110 such that the internally mounted seal 130 easily and quickly can be aligned with and sealed against the surface of the gas outlet having the orifice.

Figure 8:
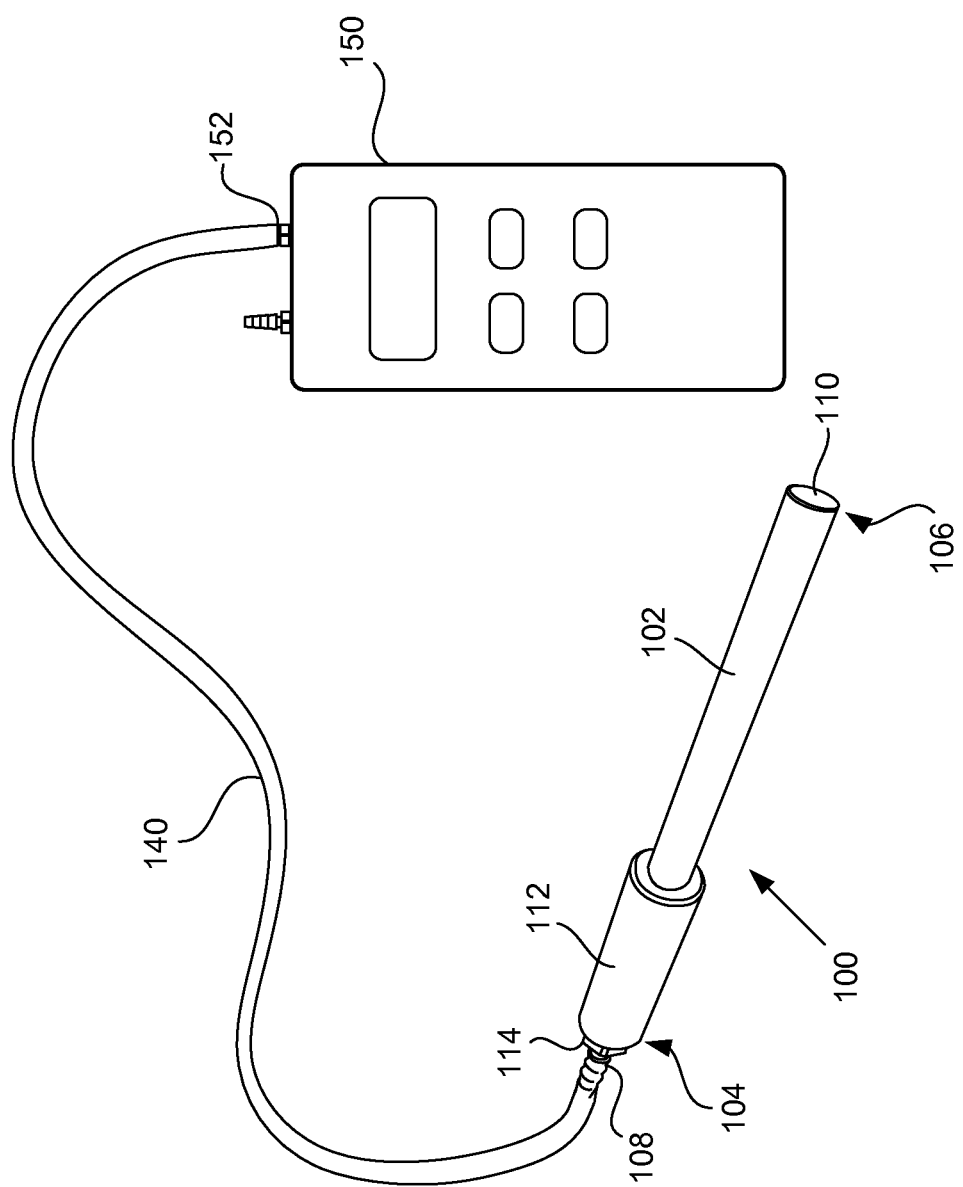
FIG. 8 is a perspective view of an assembly of a manometer quick connect device according to the exemplary embodiment of FIG. 1, a manometer, and a hose connecting the manometer to the manometer quick connect device.

With reference to FIG. 8, an end of a hose 140 of a pressure measuring device, such as a manometer 150, can be coupled to the first end 104 of the exemplary manometer quick connect device 100, for example, by the hose connector 108. The other end of the hose 140 can be coupled to a hose connector 152 of the manometer 150 (e.g., a digital manometer).

As explained above with reference to FIGS. 4 and 5, the body 102 of the exemplary manometer quick connect device 100 can include means (e.g., one or more of 108, 114, 118, and/or 140) for coupling the manometer quick connect device 100 to the manometer 150. For example, the body 102 can be configured to receive a hose connector 108 at the first end 104 for coupling the device 100 to the hose 140 of the manometer 150. The hose connector 108 can be coupled to the body 102 by a coupling 114, which can be integrally formed with the hose connector 108 or formed as a separate component from the hose connector 108. The first end 104 of the body 102 can be tapped such that a corresponding threaded portion of the coupling 114 can be mated with the body 102 to connect the hose connector 108 to the body 102. In an alternative embodiment, an outer surface of the body 102 can include a threaded portion such that a corresponding threaded portion of the coupling 114 can be secured over the outer threaded portion. In another alternative embodiment, the hose connector 108 can be integrally formed at the first end 104 of the body 102. One of ordinary skill in the art will recognize that other arrangements can be provided for coupling the body 102 to a hose of a manometer within the spirit and scope of the invention. For example, in yet another alternative exemplary embodiment, the device 100 can be configured to be coupled directly to the manometer 150. For example, the first end 104 of the manometer quick connect device 100 can be configured to be coupled directly to a fitting of the manometer 150 without the hose 140.

Figure 9:
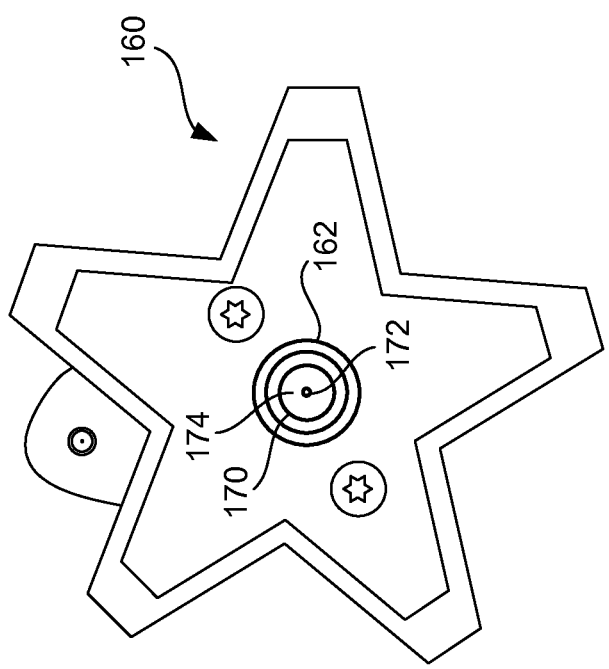
FIG. 9 is a top view of an example of a conventional gas burner of a household appliance.

With reference to FIG. 9, a conventional household appliance can include one or more gas burners having various shapes, sizes, and configurations. For example, as shown in FIG. 9, a conventional gas burner 160 can be a star-shaped gas burner. In the example, the gas burner 160 can include a cylinder portion or cylindrical opening 162 (e.g., a venturi tube) extending from an upper surface of the burner 160 to a gas outlet 170, which is disposed at or below the lower end of the cylinder portion or cylindrical opening 162 (e.g., a venturi tube) of the gas burner 160. The gas outlet 170 can include an orifice 172 formed in a surface 174.

The conventional gas burner 160 can include a plurality of parts. For simplicity, only the parts of the gas burner that are relevant to the use of the exemplary manometer quick connect device 100 for measuring the gas outlet pressure are identified by reference numerals in the drawings. For example, a conventional gas burner may include, for example, a burner head (not shown), which typically rests on top of the burner 160 under its own weight and protects the burner 160 underneath from spills, etc., a burner body, an igniter, a burner pedestal (if so equipped), a gas outlet 170 having an orifice 172, a venturi tube (e.g., 162) extending through the burner 160 to the orifice 172 formed in a surface 174 of the gas outlet 170. The components of the burner can be secured together, for example, with a plurality of screws.

With reference to the examples shown in FIGS. 10A-10C, in operation, a user can insert the second end 106 of the body 102 of the exemplary manometer quick connect device 100 into the gas burner 160 through the cylinder portion or cylindrical opening 162 (e.g., venturi tube) without having to disassemble the parts of the gas burner 160. With reference also to FIGS. 11A and 11B, the body 102 of the exemplary manometer quick connect device 100 can be inserted downward into the cylindrical opening 162 until the sealing surface 132 of the seal 130 abuts and seals against the surface 174 of the gas outlet 170, such that the hollow cavity 120 of the body 102 is in fluid communication with the orifice 172 formed in the surface 174 of the gas outlet 170. The technician can then turn on the flow of gas to the gas outlet 170 to simply and easily test the incoming gas pressure at the gas outlet 170 of the gas burner 160 using the manometer 150 without requiring the time-consuming and labor intensive process of disassembling and reassembling the gas burner 160. Particularly, the exemplary embodiments enable the technician to simply and easily access the orifice 172 of the gas outlet 170 by simply removing the burner head (not shown; the burner head typically only rests on top of the burner under its own weight to protect the burner underneath from spills) and inserting the particularly designed body 102 of the manometer quick connect device 100 into the burner 160 (e.g., into the venturi tube 162 of the burner 160) in order to test the incoming gas pressure at the gas outlet 170 using the manometer 150, to diagnose any problems that could be associated with the gas inlet pressure. Once the body 102 of the manometer quick connect device 100 is inserted into the burner 160 (e.g., into the venturi tube 162 of the burner 160), the seal 130 of the manometer quick connect device 100 engages and seals the manometer quick connect device 100 over the orifice 172 formed in the surface 174 of the gas outlet 170, thereby enabling the incoming gas pressure at the gas outlet 170 to be measured using the manometer 150 without requiring disassembly and reassembly of the burner 160. As a result, the exemplary embodiments enable the first step in diagnosing problems with the burner to be performed with very little time and effort, thereby reducing the complexity of the diagnosis process and increasing the efficiency of the diagnosis process. Unlike the conventional methods that require disassembling the burner to access the gas outlet, the exemplary embodiments require little or no disassembly of the burner 160, are simple and easy to use, and require minimal time to perform the gas outlet pressure test, thereby providing an efficient and quick reference to eliminate gas pressure issues when diagnosing problems with the burner of a household appliance such that the technician can focus on and devote more available time to evaluating and diagnosing other potential problems with the burner. The present invention can provide important advantages during testing and/or diagnosis of a household appliance at the factory, as well as diagnosis of a household appliance by a service technician in the field during use by the consumer.

With reference again to FIGS. 11A and 11B, an exemplary embodiment of the device 100 can include a first seat portion 126 for securing the seal 130 entirely within the body 102. The first seat portion 126 can have a size and shape corresponding to the size and shape of the seal 130 to securely hold the seal 130 therein. The seal 130 can be secured to the first seat portion, for example, with an adhesive or the like, or press-fit into the first seat portion 126. In other embodiments, a size and shape of the first seat portion 126 can differ from the seal 130. The first seat portion 126 can have a similar cross-sectional shape as the body 102, or a different cross-sectional shape. In other embodiments, the second end 106 of the body 102 can have a larger diameter than another part of the body 102 to accommodate the first seat portion 126 and/or the seal 130 therein.

The device 100 optionally can include a second seat portion 128, between the first seat portion 126 and the second opening 110 of the body 102. The second seat portion 128 can be configured to permit the second end 104 of the body 102 to extend over at least a part of the gas outlet 170 such that at least a portion of the gas outlet 170 is received within the opening 110 of the second end 104 of the body 102 when the sealing surface 132 of the seal 130 is sealed against the surface 174 of the gas outlet 170. The portion of the body 102 having the second seat portion 128 can function as a guide for simply and easily guiding the body 102 over the gas outlet 170, or to provide clearance that permits the gas outlet 170 to enter far enough into the body 102 to enable the sealing surface 132 of the seal 130 to abut against the surface 174 of the gas outlet 170.

In the exemplary embodiment illustrated in FIGS. 11A and 11B, the second seat portion 128 can have a larger inside diameter or dimension than the outside diameter or dimension of a part of the gas outlet 170 to function as a guide and/or to provide clearance for receiving the part of the gas outlet 170 within the opening 110 of the body 102, thereby accounting for varying degrees of misalignment of the second opening 110 of the body 102 with the gas outlet 170 during insertion of the body 102 into the burner 160 (e.g., into the venturi tube 162 of the burner 160). In other embodiments, the second seat portion 128 can be tapered to aid in guiding or redirecting the gas outlet 170 into the opening 110 of the body 102 during the process of inserting the body 102 into the burner 160. As explained above, these features are important for aligning the seal 130 with the orifice 172 and the surface 174 of the gas outlet 170, since the orifice 172 and the surface 174 of the gas outlet 170 are hidden from view by the assembled parts of the gas burner 160 and particularly when the body 102 of the exemplary manometer quick connect device 100 is inserted into the burner 160 (e.g., into the venturi tube 162 of the burner 160). In this way, the second seat portion 128 can function as a guide and/or to provide clearance for receiving part of the gas outlet 170 within the opening 110 of the body 102 even though the technician cannot view the end 110 of the body 102 or the gas outlet 170 during the testing process.

In another exemplary embodiment, the second seat portion 128 can have an inside diameter or dimension that is the same as, or approximately or substantially the same as, the outside diameter or dimension of a part of the gas outlet 170 such that a part of the gas outlet 170 fits tightly or snuggly into the second seat portion 128, thereby providing a more accurate alignment of the seal 130 around the orifice 172. The second seat portion 128 optionally can be configured to provide a tactile engagement with the gas outlet 170 such that the technician can perceive the proper alignment and engagement of the second seat portion 128 with the gas outlet 170 without visibly inspecting the connection, since these components are not visible to the technician during the testing process. As explained above, these features are important for aligning the seal 130 with the orifice 172 and the surface 174 of the gas outlet 170, since the orifice 172 and the surface 174 of the gas outlet 170 are hidden from view by the assembled parts of the gas burner 160 and particularly when the body 102 of the exemplary manometer quick connect device 100 is inserted into the burner 160 (e.g., into the venturi tube 162 of the burner 160). In this way, the second seat portion 128 can function as a guide and/or to provide clearance for receiving part of the gas outlet 170 within the opening 110 of the body 102 even though the technician cannot view the end 110 of the body 102 or the gas outlet 170 during the testing process.

In other embodiments, the second seat portion 128 can have a similar cross-sectional shape as the body 102, or a different cross-sectional shape. In other embodiments, the second end 106 of the body 102 can have a larger diameter than another part of the body 102 to accommodate the second seat portion 128. In another embodiment, the second seat portion 128 can be formed by a continuous wall, for example, extending around the entire circumference of the body 102. In another alternative embodiment, the second seat portion 128 can be formed by a plurality of walls extending from the body 102 and spaced apart from each other.

In operation, a technician can apply pressure on the device 100 in a direction toward the surface 174 of the gas outlet 170 to provide an improved seal between the sealing surface 132 of the seal 130 and the surface 174 of the gas outlet 170. As explained above, the technician can then turn on the flow of gas to the gas outlet 170 to simply and easily test the incoming gas pressure at the gas outlet 170 of the gas burner 160 using the manometer 150 (or other suitable device) without requiring the time-consuming and labor intensive process of disassembling and reassembling the gas burner 160. As a result, the exemplary embodiments enable the first step in diagnosing problems with the gas burner 160 to be performed with very little time and effort, thereby reducing the complexity of the diagnosis process and increasing the efficiency of the diagnosis process. The exemplary embodiments require little or no disassembly of the gas burner 160, are simple and easy to use, and require minimal time to perform the gas outlet pressure test, thereby providing an efficient and quick reference to eliminate gas pressure issues when diagnosing problems with the gas burner 160 of a household appliance.

Figure 12:
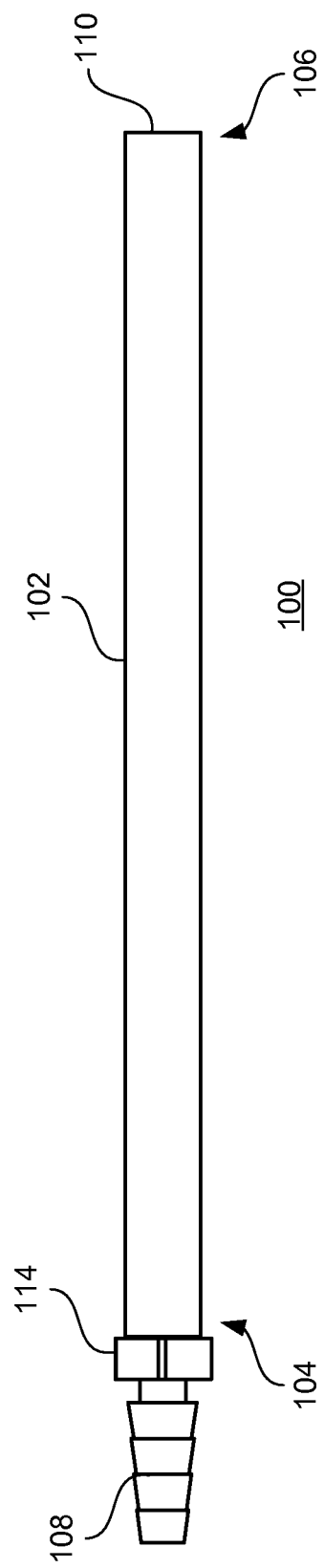
FIG. 12 is a side view of a manometer quick connect device according to yet another exemplary embodiment.

The features of the exemplary manometer quick connect device 100 are not limited to the exemplary embodiment illustrated in FIGS. 1-7. For example, as shown in FIG. 12, the body 102 optionally can be formed without a handle or grip 112. The body 102 is not limited to the cylindrical shaped body illustrated in the exemplary embodiment, and can include any suitable longitudinal size and shape, or cross-sectional size and shape, such as a circular cross-section, square cross-section, triangular cross-section, or other shape. The size and cross-sectional shape of the body 102 can be configured to approximately correspond to the size and cross-sectional shape of the opening of the burner 160 (e.g., into the venturi tube 162 of the burner 160) such that the body 102 fits into the venturi tube 162 with only a minimal amount of clearance. In this way, by limiting the lateral movement of the body 102 within the venturi tube 162 as the body 102 is being inserted into the tube 162, the second opening 110 of the body 102 can be easily and simply aligned with the gas outlet 170.

Figure 13:
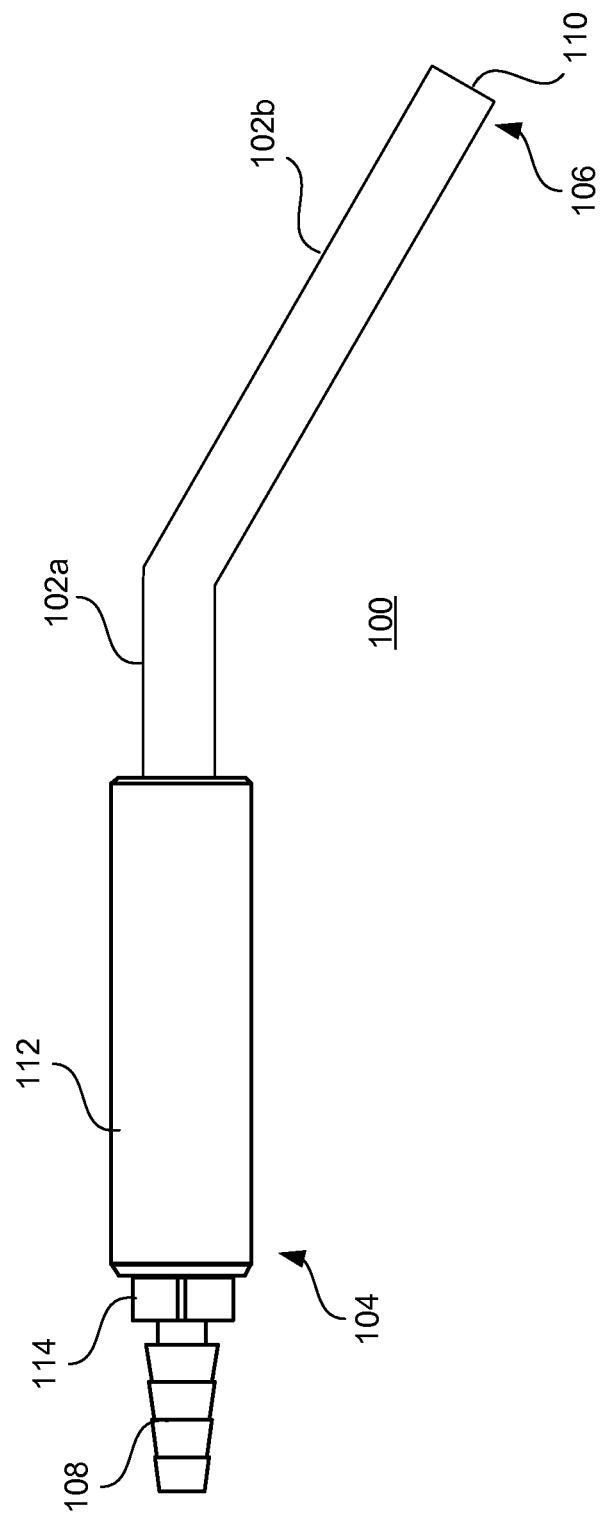
FIG. 13 is a side view of a manometer quick connect device according to another exemplary embodiment.

In the exemplary embodiment illustrated in FIGS. 1-7, the body 102 is illustrated as having a straight cylindrical or tubular shape. However, in other exemplary embodiments, for example as shown in FIG. 13, the body 102 alternatively can be angled or curved to improve access and/or provide clearance for various arrangements of gas outlets. For example, as shown in FIG. 13, the body 102 can include a first portion 102a and a second portion 102b that is disposed at an angle to the first portion 102a. Alternatively, the body 102 can include a curved portion (not shown), such as a continuously curved portion. The body 102 can include one or more angled or curved portions to provide improved access depending on the particular arrangement of the gas outlet and/or household appliance.

In other exemplary embodiments, one or more adaptors or extensions can be coupled to either end of the body 102 to enable the device 100 to work in various situations and applications. For example, one or more adaptors or extensions can be coupled to the first end 104 of the body 102 to enable the device 100 to work with a variety of pressure measuring devices (e.g., 150) and configurations. On the other hand, one or more adaptors or extensions can be coupled to the second end 106 of the body 102 to enable the device 100 to work with a variety of types, sizes, shapes, and models of gas outlets, burners, and/or household appliances.

With reference to FIGS. 14-16, exemplary embodiments of the device 100 can include can include a variety of arrangements and configurations of the first end 106 and the seal 130 that enable to the hollow cavity 120 of the body 102 to be sealed to a gas outlet (e.g., 170) of a household appliance.

For example, as shown in FIG. 14, in an exemplary embodiment, the first end 106 of the body 102 can include a first seat portion 126 that can be formed with a larger diameter than the hollow cavity 120 to form a seat for securing at least a first part of the seal 130 within the opening 110. At least a second part of the seal 130 extends beyond the opening 110 of the second end 106 for abutting the surface 174 of the gas outlet 170 (shown in FIGS. 11A-11B) or another surface surrounding the gas outlet 170. In this way, the exemplary device 100 can be engaged with and sealed against the surface 174 of the gas outlet 170 without the body 102 having to extend over or to surround any part of the gas outlet 170.

In another exemplary embodiment, as shown in FIG. 15, the first end 106 of the body 102 similarly can include a first seat portion 126 that can be formed with a larger diameter than the hollow cavity 120 to form a seat for securing the seal 130 partly within the opening 110 such that at least a portion of the seal 130 extends beyond the opening 110 of the second end 106. In this example, the seal 130 alternatively can include a rim or flange portion 136 extending away from the opening 134 to provide a larger surface area for sealing the seal 130 to the surface 174 of the gas outlet 170 (shown in FIGS. 11A-11B).

In yet another exemplary embodiment, as shown in FIG. 16, the first end 106 of the body 102 similarly can include a first seat portion 126 to form a seat for securing the seal 130 partly within the opening 110 such that at least a portion of the seal 130 extends beyond the opening 110 of the second end 106, and a flange portion 136. In this exemplary embodiment, the flange portion 136 can include one or more wall or guide portions, such as a cylindrical wall portion 138, extending in a longitudinal direction away from the body 102. The one or more wall or guide portions, such as a cylindrical wall portion 138, can partially or completely surround the gas outlet or extend at least partially over a portion of the gas outlet (e.g., 170 shown in FIGS. 11A-11B).

In an exemplary embodiment, the cylindrical wall portion 138 can have a larger inside diameter or dimension than the outside diameter or dimension of a part of the gas outlet 170 to function as a guide and/or to provide clearance for receiving the part of the gas outlet 170 within the cylindrical wall portion 138, thereby accounting for varying degrees of misalignment of the cylindrical wall portion 138 with the gas outlet 170 during insertion of the body 102 into the burner 160 (e.g., into the venturi tube 162 of the burner 160). In other embodiments, the cylindrical wall portion 138 can be tapered to aid in guiding or redirecting the gas outlet 170 into the cylindrical wall portion 138 during the process of inserting the body 102 into the burner 160. In other exemplary embodiments, the cylindrical wall portion 138 can have an inside diameter or dimension that is the same as, or approximately or substantially the same as, the outside diameter or dimension of a part of the gas outlet 170 such that a part of the gas outlet 170 fits tightly or snuggly into the cylindrical wall portion 138, thereby providing a more accurate alignment of the seal 130 around the orifice 172. The cylindrical wall portion 138 can be configured to provide a tactile engagement with the gas outlet 170 such that the technician can perceive the proper alignment and engagement of the cylindrical wall portion 138 with the gas outlet 170 without visibly inspecting the connection, since these components are not visible to the technician during the testing process. As explained above, these features are important for aligning the seal 130 with the orifice 172 and the surface 174 of the gas outlet 170, since the orifice 172 and the surface 174 of the gas outlet 170 are hidden from view by the assembled parts of the gas burner 160 and particularly when the body 102 of the exemplary manometer quick connect device 100 is inserted into the burner 160 (e.g., into the venturi tube 162 of the burner 160). In this way, the cylindrical wall portion 138 can function as a guide and/or to provide clearance for receiving part of the gas outlet 170 and aligning the sealing surface 132 with the orifice 172 and surface 174 of the gas outlet 170 even though the technician cannot view the second end 106 of the body 102 or the gas outlet 170 during the testing process.

In each of the examples shown in FIGS. 14-16, the seal 130 can engage and seal against a surface 174 of the gas outlet 170

(shown in FIGS. 11A-11B), for example, that surrounds the orifice 172. With reference again to the exemplary embodiments illustrated in FIGS. 14 and 15, a part of the seal 130 can extend from the second end 106 of the body 102 such that the seal 130 engages and seals against a surface of the gas outlet 170, such as the surface surrounding the orifice 172. With reference again to the exemplary embodiment of FIG. 16, a part of the seal 130, such as the cylindrical wall 138, can extend over a part of the gas outlet 170 in a manner similar to the second end 106 of the tubular wall in the embodiment shown in FIGS. 16A and 16B, and a part of the seal 130, such as the sealing surface 132 and/or the flange part 136, can engage and seal against the surface 174 of the gas outlet 170, such as the surface surrounding the orifice 172.

In other embodiments, at least a part of the seal 130, such as the sealing surface 132, can be flush with, or extend from, the second opening 110 of the body 102 of the manometer quick connect device 100 when the seal 130 is sealed to the gas outlet 170. The sealing surface 132 can be configured to abut and seal against the surface 174 of the gas outlet 170 having the orifice 172 such that the seal 130 surrounds the orifice 172. In other exemplary embodiments, the seal 130 can be configured to seal against other surfaces of the gas outlet 170, such as one or more sides of the gas outlet 170, for example, which are perpendicular to the surface 174 of the gas outlet 170, provided that a seal is formed between the manometer quick connect device 100 and the gas outlet 170 such that the hollow cavity 120 is in fluid communication with the orifice 172 of the gas outlet 170.

In other exemplary embodiments, all or part of the seal 130 can be disposed outside of the cavity 120 or opening 110 of the body 102. For example, in an exemplary embodiment, the entire seal 130 can be positioned over the exterior surface of the second end 106 of the body 102 to form a sealing surface for abutting the surface 174 of the gas outlet 170 and/or a guide for aligning the body 102 with the gas outlet 170. In other embodiments, the seal 130 can extend over the exterior surface of the second end 106 of the body 102 while also extending into the opening 110 of the body 102 to form a sealing surface for abutting the surface 174 of the gas outlet 170 and/or a guide for aligning the body 102 with the gas outlet 170.

With reference again to FIGS. 1-16, an exemplary embodiment of the invention is directed to a manometer quick connect device 100 for pressure testing a gas outlet 170 of a household cooking appliance. The manometer quick connect device 100 includes a body 102 having a first end 104 and a second end 106 opposite the first end 104, the body 102 having a hollow cavity 120 extending in a longitudinal direction from a first opening 116 in the first end 104 to a second opening 110 in the second end 106, the first end 104 of the body 102 including means for coupling the manometer quick connect device to a manometer 150, and a seal 130 at the second end 106 of the body 102, wherein the seal 130 includes a sealing surface for sealing the hollow cavity 120 of the body to a surface of the gas outlet 170, the seal 130 including an opening 134 for providing fluid communication between the hollow cavity and an orifice of the gas outlet.

Another exemplary embodiment of the invention is directed to a manometer quick connect device 100 for pressure testing a gas outlet 170 of a household cooking appliance. The manometer quick connect device 100 includes a body 102 having a first end 104 and a second end 106 opposite the first end 104, the body 102 having a hollow cavity 120 extending in a longitudinal direction from a first opening 116 in the first end 104 to a second opening 110 in the second end 106, the first end 104 of the body 102 including means (e.g., 108, 114, and/or 118) for coupling the manometer quick connect device to a manometer 150, and sealing means (e.g., 130) at the second end of the body, the sealing means for sealing the hollow cavity of the body to a surface of the gas outlet and providing fluid communication between the hollow cavity and an orifice of the gas outlet.

Another exemplary embodiment of the invention is directed to a system for pressure testing a gas outlet 170 of a household cooking appliance, the system comprising a manometer 150 and a manometer quick connect device 100 coupled to the manometer 150. The manometer quick connect device 100 includes a body 102 having a first end 104 and a second end 106 opposite the first end 104, the body 102 having a hollow cavity 120 extending in a longitudinal direction from a first opening 116 in the first end 104 to a second opening 110 in the second end 106, the first end 104 of the body 102 including means for coupling the manometer quick connect device to a manometer 150, and a seal 130 at the second end 106 of the body 102, wherein the seal 130 includes a sealing surface for sealing the hollow cavity 120 of the body to a surface of the gas outlet 170, the seal 130 including an opening 134 for providing fluid communication between the hollow cavity and an orifice of the gas outlet.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A manometer quick connect device for pressure testing a gas outlet of a household cooking appliance, the manometer quick connect device comprising:
   a body having a first end and a second end opposite the first end, the body having a hollow cavity extending in a longitudinal direction from a first opening in the first end to a second opening in the second end, the first end of the body including a feature for coupling the manometer quick connect device to a manometer; and
   a seal at the second end of the body, wherein the seal includes a sealing surface for sealing the hollow cavity of the body to a surface of the gas outlet, the seal including an opening for providing fluid communication between the hollow cavity and an orifice of the gas outlet.

2. The manometer quick connect device of claim 1, wherein at least a first part of the seal is disposed within the hollow cavity at the second end of the body.

3. The manometer quick connect device of claim 2, wherein the second end of the body includes a first recessed portion having a first diameter that is larger than a diameter of the hollow cavity, the first recessed portion forming a seat for securing the seal within the hollow cavity.

4. The manometer quick connect device of claim 3, wherein the seal is recessed entirely within the hollow cavity a predetermined distance away from the second opening such that a guide part of the body extends in the longitudinal direction from the seal to the second opening, the guide part for engaging or surrounding at least a part of the gas outlet and aligning the sealing surface around the orifice of the gas outlet when the seal is sealed against the surface of the gas outlet.

5. The manometer quick connect device of claim 4, wherein the guide part of the body includes a second recessed portion having a second diameter that is larger than the first diameter of the first recessed portion, the second recessed portion being disposed between the first recessed portion and the second opening.

6. The manometer quick connect device of claim 2, wherein the sealing surface of the seal is flush with the second opening.

7. The manometer quick connect device of claim 1, wherein at least a part of the seal is disposed outside the second end of the body.

8. The manometer quick connect device of claim 2, wherein at least a second part of the seal extends outward in the longitudinal direction from the second opening.

9. The manometer quick connect device of claim 8, wherein the second part of the seal includes a flange portion that extends in a direction perpendicular to the longitudinal direction.

10. The manometer quick connect device of claim 8, wherein the second part of the seal includes a guide portion extending in the longitudinal direction away from the second end to guide the gas outlet toward the sealing surface and align the sealing surface of the seal around the orifice of the gas outlet.

11. The manometer quick connect device of claim 8, wherein the guide portion includes a cylindrical wall that surrounds at least a portion of the gas outlet when the seal is sealed against the surface of the gas outlet.

12. The manometer quick connect device of claim 1, wherein the means for coupling comprises a threaded portion at the first end of the body.

13. The manometer quick connect device of claim 12, further comprising:
a hose connector coupled to the threaded portion, the hose connector for coupling the manometer quick connect device to a hose of the manometer.

14. The manometer quick connect device of claim 12, wherein the threaded portion is in the hollow cavity at the first end of the body.

15. The manometer quick connect device of claim 12, wherein the threaded portion is on an exterior of the first end of the body.

16. The manometer quick connect device of claim 1, wherein the body includes an integral hose connector at the first end, the integral hose connector for coupling the manometer quick connect device to a hose of the manometer.

17. The manometer quick connect device of claim 1, wherein the body comprises a tubular body.

18. The manometer quick connect device of claim 17, wherein the tubular body comprises a first tubular portion having a first outside diameter, and a second tubular portion having a second outside diameter, the second outside diameter being greater than the first outside diameter to form a handle portion.

19. A manometer quick connect device for pressure testing a gas outlet of a household cooking appliance, the manometer quick connect device comprising:
a body having a first end and a second end opposite the first end, the body having a hollow cavity extending in a longitudinal direction from a first opening in the first end to a second opening in the second end, the first end of the body including means for coupling the manometer quick connect device to a manometer; and
sealing means at the second end of the body, the sealing means for sealing the hollow cavity of the body to a surface of the gas outlet and providing fluid communication between the hollow cavity and an orifice of the gas outlet.

* * * * *